(12) United States Patent
Orgaz Villegas et al.

(10) Patent No.: US 8,263,864 B2
(45) Date of Patent: Sep. 11, 2012

(54) DEVICE FOR ELECTRICAL BONDING OF ELECTRICAL CABLES SHIELDING ON COMPOSITE STRUCTURES

(75) Inventors: Eduardo Orgaz Villegas, Madrid (ES); Jorge Nogal Martín, Madrid (ES)

(73) Assignee: Airbus Operations S.L., Madrid (ES)

( * ) Notice: Subject to any disclaimer, the term of this patent is extended or adjusted under 35 U.S.C. 154(b) by 790 days.

(21) Appl. No.: 11/794,513

(22) PCT Filed: Dec. 27, 2005

(86) PCT No.: PCT/EP2005/057185
§ 371 (c)(1),
(2), (4) Date: Oct. 20, 2009

(87) PCT Pub. No.: WO2006/069997
PCT Pub. Date: Jul. 6, 2006

(65) Prior Publication Data
US 2010/0089608 A1    Apr. 15, 2010

(30) Foreign Application Priority Data
Dec. 30, 2004    (ES) .................................. 200403148

(51) Int. Cl.
*H02G 15/02* (2006.01)
*H02G 15/08* (2006.01)
*B64D 45/02* (2006.01)
*H05F 3/00* (2006.01)
*H01R 4/66* (2006.01)
*H01R 13/648* (2006.01)

(52) U.S. Cl. .............. 174/78; 244/1 A; 361/218; 439/98
(58) Field of Classification Search .................... 174/78; 361/218, 117, 216, 217, 219; 244/1 A; 439/98, 439/99, 100
See application file for complete search history.

(56) References Cited

U.S. PATENT DOCUMENTS

| 3,922,050 A | 11/1975 | Lettini et al. |
| 4,023,882 A | 5/1977 | Pettersson et al. |
| 4,473,714 A | 9/1984 | Brownell et al. |
| 4,479,163 A * | 10/1984 | Bannink et al. ................ 361/218 |
| 5,418,330 A * | 5/1995 | Rook .............................. 174/78 |

FOREIGN PATENT DOCUMENTS

| DE | 198 48 617 | 4/2000 |
| WO | 83/01345 | 4/1983 |

* cited by examiner

*Primary Examiner* — Timothy Thompson
*Assistant Examiner* — Roshn Varghese
(74) *Attorney, Agent, or Firm* — Ladas & Parry LLP

(57) ABSTRACT

The invention relates to an electrical bonding device of a shielding (3) of electrical cables (5) in aircraft arranged in its structure in an area (15) made with a carbon fiber-based composite, comprising a metallic plate (9) with a lug (7) where a bonding lead (1) projecting from the shielding (3) is connected, being fixed to said area (15) by means of titanium rivets (11) installed under dry conditions with cadmium steel rings (17), which are coated with a sealing material (19).

9 Claims, 1 Drawing Sheet

DEVICE FOR ELECTRICAL BONDING OF ELECTRICAL CABLES SHIELDING ON COMPOSITE STRUCTURES

FIELD OF THE INVENTION

The invention relates to the electrical bonding of intermediate points of an electrical cable bundle shielding directly to structures made of a composite with low electrical conductivity when the bundles exceed three meters in length in areas that are not or do not form part of the structure demarcating the fuel tank.

BACKGROUND OF THE INVENTION

The need to suitably protect cables in aircraft from electromagnetic fields created by lightning, which particularly translates into transitory current and voltage drops, is known in the aeronautical industry.

Up until a few years ago, metallic materials (for example aluminum) were used in the aeronautical field as the primary material of aircraft structures. Having a large amount of said materials in the airplane involved a good grounding of the systems and made the airplane have a rather good electrical continuity and relatively low electrical resistance values, thus preventing potential drops, relevant structural damage, the presence of burning or incandescent particles or hot gases released at the point of contact between two conductors when a large current density passed (sparking), and overheating of the material due to the direct striking of lightning or for being subjected to a high current density (hot-spot).

The vertiginous evolution towards aircraft structures built with carbon fiber has caused that the damage occurring in this type of material as a result of its heterogeneous features are considerable and to be taken into account due to its criticality.

In aircrafts built with carbon fiber, the traditional bonding concept in an airplane, known as a primary metallic structure, tends to disappear and the traditional protection methods are no longer applicable.

Providing a structure built with carbon fiber means that in case of lightning strike, from the electromagnetic point of view, the systems and equipment enclosed by said structure are more vulnerable and are therefore more exposed to induced effects, which basically translate into transient current and voltage drops. These transient states normally affect the wiring and take place as a result of the magnetic field created by the current of the lightening circulating through the outer structure.

"Hybrid" solutions, which combine electrical bonding to a metallic structure and to carbon fiber, are currently known to resolve these problems.

In particular, to protect the cable bundles installed in areas with a composite catalogued as "exposed areas" for these purposes, a shielding or metal braid minimizing the induced effects in the cables of said bundles is added. This shielding is generally electrically bonded at both ends appropriately since this is the most critical point of the installation (for the purpose of having good electromagnetic protection) and when the routes exceed 3 meters, an "intermediate bonding point" must be installed, connecting the shielding to a metallic structure every 3 meters.

The inability in some cases of having sufficient metallic structure, or the lack of closeness between the systems installed in the airplane and the metallic structures thereof, makes it necessary to install additional bonding strips and bonding jumpers, increasing airplane costs and weight.

This invention proposes a solution to this drawback.

SUMMARY OF THE INVENTION

The electrical bonding device of a shielding of electrical cables arranged on the structure of an aircraft in an area exposed to the effects induced by electromagnetic fields generated by lightning and made with a composite according to this invention, comprises a metallic plate with a lug where connected thereto is a projecting lead of the shielding which is fixed to said area by means of titanium rivets installed under dry conditions, with cadmium steel collars, which are coated with a sealing material.

With this device, the intermediate points of the shielding are electrically bonded directly to the airplane structure made with a carbon fiber based-composite of the airplane. This prevents the use of metallic strips for these specific bonding points, which increase airplane weight, makes the design more complex, and therefore increase costs.

Generally speaking, this device can be applied in structural areas of the airplane built from carbon fiber where there is an electrical cable installation, the shielding of which must be bonded, as long as the carbon fiber area does not form part of or demarcate an airplane fuel tank. To that respect, it is considered that despite the fact that carbon fiber is much more resistive than any other metal, if the area is thick enough it may have enough resistive capacity to conduct the normally circulating type of current levels through an intermediate bonding point.

DETAILED DESCRIPTION OF THE INVENTION

Figure 1:
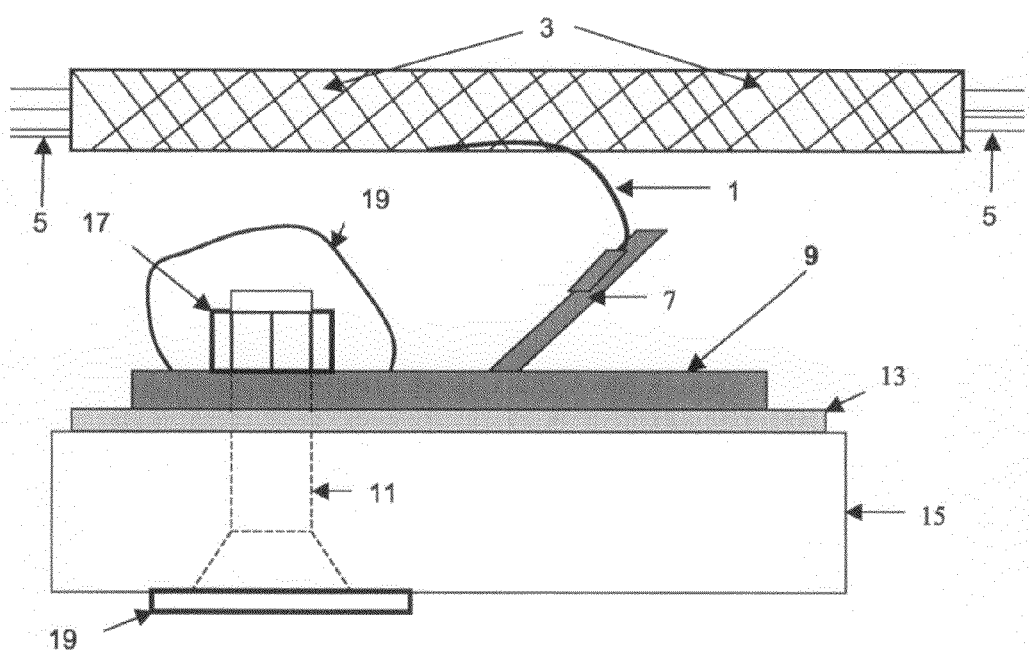
FIG. 1 shows the configuration of the bonding device of a shielding of electrical cables in aircraft according to the invention.

According to FIG. 1, it can be observed that the bonding lead 1 of the shielding 3 of an electrical cable bundle 5 is connected to a lug 7 of the metallic plate 9 which is fixed by means of rivets 11 to the area 15 of the airplane structure made of carbon fiber.

The rivets 11 which must be used, preferably the number of 3, are Hi-lock type anodized titanium rivets and with a minimum of 4 mm in diameter. The head of the rivet must be countersunk to achieve greater contact between the rivet and the carbon fiber surface.

The collar 17 of the rivets 11, in contact with the metallic plate 9, is made of cadmium steel.

The ends of the rivets are coated with a sealing material 19 to prevent moisture from entering the bonding, painted with a colored varnish that allows identifying the grounding points.

In a preferred embodiment of the invention, the metallic plate is made of titanium since this material allows the plate to be placed in direct contact with the area 15 of carbon fiber since there is not a high enough difference in electrochemical potentials to cause corrosion. Titanium also has the advantage of being able to be installed in areas requiring fireproof materials.

In an alternative embodiment, the metallic plate 9 is made of aluminum, which has greater conductivity than titanium. In this case, the device must include an insulating sheet 13, for example, fiberglass, between the metallic plate 9 and the area 15 of carbon fiber to prevent corrosion.

From the technical point of view, the main feature of the device according to this invention is based on the fact that the bonding is done directly on the area made of carbon fiber, the electrical resistance of which depends on the area where the current is applied or propagated.

Figure 2:
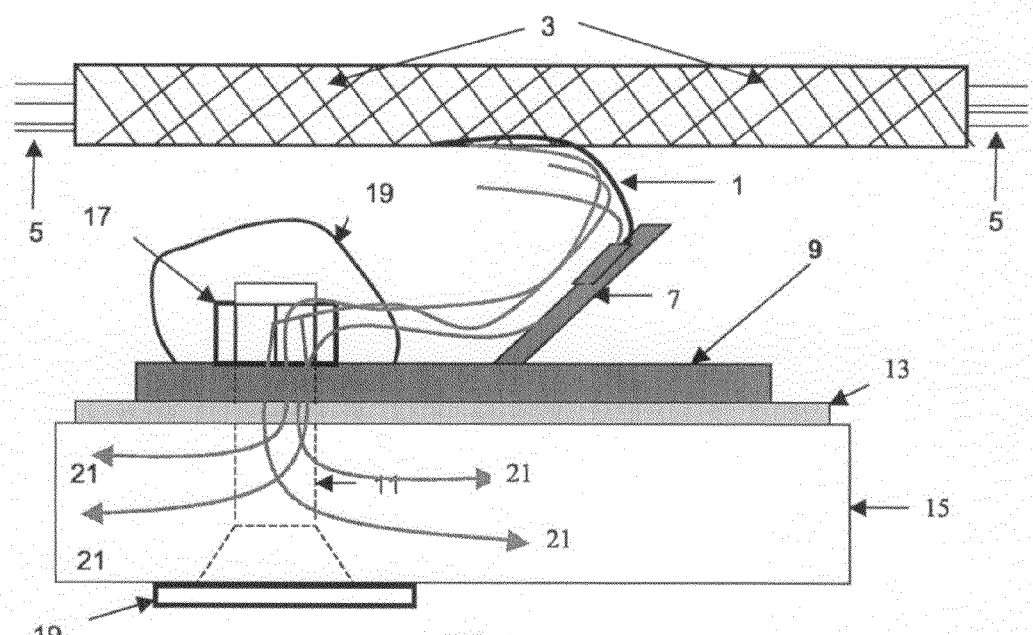
FIG. 2 shows the configuration of the bonding device of a shielding of electrical cables in aircraft according to the invention including the distribution of the current in the event of lightning strike, causing an induced current on the shielding.

In this case, propagation of the current represented by means of the current lines 21 in FIG. 2 is generated from the shaft of the rivets 11 and parallel to the direction of the carbon fibers, which conducts better than if it were perpendicular thereto.

The invention claimed is:

1. A bonding device of a shielding of electrical cables arranged in the structure of an aircraft in the area made of a carbon fiber-based composite, wherein the bonding device comprises a metallic plate with a lug where a bonding lead projecting from said shielding is connected, which is fixed to said area by means of titanium rivets installed under dry conditions with cadmium steel rings, which are coated with a sealing material.

2. A device according to claim 1, wherein the metallic plate is made with titanium.

3. A device according to claim 1, wherein the metallic plate is made with aluminum and in that it also comprises an insulating sheet located between it and the area.

4. A device according to claim 3, wherein the bonding lead projects from the shielding at an intermediate area thereof.

5. A device according to claim 1, which includes at least three rivets.

6. A device according to claim 5, wherein the bonding lead projects from the shielding at an intermediate area thereof.

7. A device according to claim 1, wherein the bonding lead projects from the shielding at an intermediate area thereof.

8. A device according to claim 1, wherein the bonding lead projects from the shielding at an intermediate area thereof.

9. A system for protecting electric cables in an aircraft from electromagnetic fields caused by lightning which comprises shielding surrounding said cables, said shielding being connected by a lead projecting from said shielding to a lug on a metallic plate affixed to an area of aircraft structure formed of carbon fiber-based composite by means of titanium rivets installed under dry conditions with cadmium steel rings which are coated with a sealing material.

* * * * *